United States Patent Office 2,962,456
Patented Nov. 29, 1960

2,962,456
PROCESS FOR PREPARING FOAMED STYRENE POLYMERS CONTAINING AN INORGANIC PIGMENT

Frank A. Carlson, Jr., Springfield, Mass., assignor to Monsanto Chemical Company, St. Louis, Mo., a corporation of Delaware No Drawing. Filed Jan. 6, 1958, Ser. No. 707,135

7 Claims. (Cl. 260—2.5)

The present invention relates to a process for preparing foamed styrene polymers and to foamable styrene polymer compositions to be employed therein.

Styrene polymer foams constitute a valuable class of materials which are finding increasingly wide application in the fabrication of numerous industrial and consumer articles. A widely used method for fabricating such styrene polymer foams comprises extruding particles of stylrene polymers which have dispersed throughout the polymer a low boiling aliphatic hydrocarbon. Several problems are encountered in this process. First, it is difficult and costly to prepare styrene polymers having the desired quantity of aliphatic hydrocarbon dispersed throughout the polymer. Second, the handling and storage of such compositions presents a fire hazard. Third, on storage, such compositions frequently lose a portion of their aliphatic hydrocarbon content and this loss can lead to erratic results when the compositions are extruded.

It is an object of this invention to provide an improved extrusion process for preparing foamed styrene polymers.

Another object of this invention is to provide novel foamable styrene polymer compositions.

Other objects and advantages of the invention will become apparent from the following detailed description thereof.

It has been discovered that foamed styrene polymers having excellent properties can be obtained by extruding a free flowing intimate blend of a finely divided thermoplastic styrene polymer and a finely divided inorganic pigment having adsorbed on the surface thereof, based upon the weight of the inorganic pigment, at least 25 weight percent of an aliphatic hydrocarbon having a boiling point within the range of about 10–80° C.

The following examples are set forth to illustrate more clearly the principle and practice of this invention to those skilled in the art. Unless otherwise specified, where quantities are mentioned they are parts by weight.

EXAMPLE I

Part A

Ten parts of a finely divided silica pigment having an average particle size of about 0.02 micron are charged to a water cooled ribbon blender. The blender is started and 9 parts of commercial hexane (B.P.=69.0° C.) are added to the silica in small increments over a period of 30 minutes. The product is a free flowing solid that is dry to the touch. One hundred parts of a styrene homopolymer having a Staudinger molecular weight of about 60,000 and a particle size of about 30 mesh are added to the blender and agitation is continued for 30 minutes. The resulting product is a free flowing uniform blend of the styrene homopolymer and the silica pigment which has the hexane adsorbed thereon.

Part B

The composition of Part A is extruded at a temperature of about 300° F. through a 1½" diameter single screw extruder which is fitted with a 3" wide sheet die having an opening of 0.04". The foamed resin is extruded at a rate of 35 lbs./hour and has a density of 3.1 lbs./ft.$^3$. The foam has a fine cell size with the majority of the cells of a diameter in the range of 0.005–0.01".

EXAMPLE II

Example I, Part A, is repeated except that the styrene homopolymer and the silica pigment are first blended together and the hexane is then added thereto. The resulting compositions is extruded under the conditions specified in Example I, Part B, and the foamed styrene polymer that is obtained has substantially identical properties.

EXAMPLE III

Example II is repeated except that the silica is replaced with, respectively, a yellow cadmium sulfide pigment having an average particle size of 0.3–0.4 micron, a calcium carbonate pigment having an average particle size of 0.1 micron, an ultramarine blue pigment having an average particle size of 5 microns, a carbon black having an average particle size of less than 0.1 micron, an alumina pigment having an average particle size of less than 2 microns and a finely ground diatomaceous earth. In each case results comparable to those in Example II are obtained.

The foamable styrene polymer compositions of the invention consist of a free flowing intimate blend of (a) a finely divided styrene polymer and (b) a finely divided inorganic pigment which has adsorbed thereon, based upon the weight of the inorganic pigment, at least 25 weight percent of a low boiling aliphatic hydrocarbon. The styrene polymer and the inorganic pigment are present in such proportions that the composition contains 5–10 parts of the low boiling aliphatic hydrocarbon for each 100 parts of the styrene polymer. The styrene polymer employed has an average particle size of less than about 10 mesh and preferably less than about 20 mesh. The inorganic pigment has a particle size of less than about 5 microns and preferably less than about 1 micron. Optimum results are obtained with compositions in which the inorganic pigment has an average size of less than about 0.1 micron.

The foamable compositions can be prepared by first blending and adsorbing a low boiling aliphatic hydrocarbon on the surface of the inorganic pigment and subsequently blending the inorganic pigment with the styrene polymer. Alternatively, a boiling aliphatic hydrocarbon may be blended with a previously prepared intimate physical admixture of the styrene polymer and the inorganic pigment. In another embodiment of the invention a low boiling aliphatic hydrocarbon, the inorganic pigment and the styrene polymer may be simultaneously blended together. In either of the last two methods the low boiling aliphatic hydrocarbon is preferentially adsorbed on the surface of the inorganic pigment.

The styrene polymer included in the compositions of the invention is thermoplastic and may be either a styrene homopolymer or an interpolymer of styrene containing at least 85 weight percent of styrene and up to 15 weight percent of a vinylidene monomer interpolymerizable with styrene. Examples of monomers that may be interpolymerized with the styrene include the aliphatic conjugated 1,3-dienes, e.g., butadiene, isoprene, etc., alpha, beta unsaturated monocarboxylic acids and derivative thereof, e.g., acrylic acid, methacrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. It is also possible to employ blends of 2 or more styrene polymers. If desired, all or a portion of the styrene may be replaced with its closely related homologues such as alpha-methylstyrene, o-, m-, and p-methylstyrenes, o-, m- and p-ethylstyrenes, 2,4-dimethylstyrene, etc. In general, the styrene polymers employed should have a molecular weight in the range of about 40,000–80,000 (as determined by the Staudinger method).

The particular inorganic pigment employed in the invention is not critical provided that it has a particle size within the range previously stated and that its surface is sufficiently porous to adsorb and hold the aliphatic hydrocarbon. The term "pigment" is employed in the broad sense of describing inorganic compounds having these properties and is not restricted to inorganic compounds having tinctorial properties. Typical examples of inorganic pigments which may be employed include carbon black, charcoal, other forms of activated carbon, natural and treated clays, fuller's earth, finely ground limestone, bauxite, etc., multifarious inorganic colorants such as ultramarine blue, cadmium yellow, the ferrocyanide pigments, etc., various commercially available inorganic salts such as calcium carbonate, calcium sulfate, barium sulfate, etc., metallic oxides such as silica, iron oxide, alumina, thoria, etc. Many other examples of suitable inorganic pigments will be apparent to those skilled in the art. For example, virtually any of the materials employed as dehydrating catalysts or as catalyst supports in the petroleum cracking art may be employed in the present invention.

The foaming agent included in the compositions of the invention and adsorbed upon the inorganic pigments is an aliphatic hydrocarbon boiling within the range of about 10–80° C. and preferably about 30–80° C. Examples of such foaming agents include pentane, hexane, cyclopentane, cyclopentadiene and petroleum ethers boiling within the indicated temperature range. If desired, mixtures of 2 or more such foaming agents may be employed.

The aliphatic hydrocarbon foaming agent is adsorbed on the inorganic pigment in an amount sufficient to constitute at least 25 weight percent of the inorganic pigment. The upper limit on the quantity of the aliphatic hydrocarbon that can be adsorbed on the inorganic pigment is set primarily by the consideration that the inorganic pigment should remain relatively free-flowing after the aliphatic hydrocarbon is adsorbed thereon. This upper limit may vary considerably and is dependent upon such factors as the chemical nature of the inorganic pigment, the surface characteristics of the inorganic pigment, etc. In many cases it is possible for the inorganic pigment to adsorb the aliphatic hydrocarbon in amounts of up to at least 150 weight percent of its own weight.

The extrusion process of the invention is conventional except for the composition employed therein. For example, the extrusion operation may be carried out in continuous screw extruders at temperatures ranging from about 250° F. to about 400° F. with the most uniform material being obtained by extruding at temperatures of 300–325° F. The material may be extruded through dies of any desired configuration into open or closed molds or into the open air. The pressure within the die should be greater than about 150 p.s.i. to prevent premature foaming within the apparatus.

The above descriptions and particularly the examples are set forth by way of illustration only. Many other variations and modifications thereof will be apparent to those skilled in the art and can be made without departing from the spirit and scope of the invention herein described.

What is claimed is:

1. A process for preparing foamed styrene polymers which comprises extruding a foamable styrene polymer composition at a temperature of about 250–400° F.; said foamable styrene polymer composition consisting essentially of a free flowing uniform physical admixture of (a) a thermoplastic styrene polymer of the group consisting of styrene homopolymers and styrene interpolymers containing at least 85 weight percent of styrene and up to 15 weight percent of a vinylidene monomer interpolymerizable with styrene, said styrene polymer having an average particle size of less than about 10 mesh, and (b) a finely divided inorganic pigment having an average particle size of less than about 5 microns and having adsorbed on the surface thereof, based upon the weight of the inorganic pigment, at least about 25 weight percent of an aliphatic hydrocarbon boiling in the range of about 10–80° C.; said styrene polymer and inorganic pigment being present in such proportions that the composition contains about 5–10 parts of the aliphatic hydrocarbon per 100 parts of the styrene polymer.

2. The process of claim 1 in which the styrene polymer is a styrene homopolymer and the aliphatic hydrocarbon is hexane.

3. The process of claim 1 in which the inorganic pigment is silica.

4. The process of claim 1 in which the inorganic pigment is diatomaceous earth.

5. The process of claim 1 in which the inorganic pigment is calcium carbonate.

6. The process of claim 1 in which the inorganic pigment is carbon black.

7. The process of claim 1 in which the inorganic pigment is alumina.

References Cited in the file of this patent

UNITED STATES PATENTS

| | | |
|---|---|---|
| 2,577,743 | De Long | Dec. 11, 1951 |
| 2,816,827 | Roth | Dec. 17, 1957 |